(12) United States Patent
Werner (10) Patent No.: US 8,500,205 B2
(45) Date of Patent: Aug. 6, 2013

(54) STAY FOR DUMP BODY

(75) Inventor: Gregory K Werner, Durango, IA (US)

(73) Assignee: Deere & Company, Moline, IL (US)

( * ) Notice: Subject to any disclaimer, the term of this patent is extended or adjusted under 35 U.S.C. 154(b) by 330 days.

(21) Appl. No.: 13/029,249

(22) Filed: Feb. 17, 2011

(65) Prior Publication Data

US 2012/0212031 A1 Aug. 23, 2012

(51) Int. Cl.
*B60P 1/04* (2006.01)

(52) U.S. Cl.
USPC ........................................ 298/17 B; 298/22 P (58) Field of Classification Search
USPC ... 298/17 B, 22 R, 22 P, 22 J, 22 D; 248/351, 248/354.1
See application file for complete search history.

(56) References Cited

U.S. PATENT DOCUMENTS 3,183,037 A * 5/1965 Reichert ......................... 298/38
3,955,851 A 5/1976 Umeda et al.

FOREIGN PATENT DOCUMENTS

DE 1921855 U 8/1965

OTHER PUBLICATIONS

European Search Report dated May 3, 2012 (4 pages).
Images of Volvo A30E Articulated Dump Truck (3 pages)(admitted as prior art before Feb. 17, 2011).
Images of Deere 400D and 300D Articulated Dump Truck (3 pages)(Jan. 6, 2011).
Background Information (1 page)(admitted as prior art before Feb. 17, 2011).

* cited by examiner

*Primary Examiner* — Stephen Gordon (57) ABSTRACT

A dump truck has a dump body and a stay to hold the dump body selectively in multiple raised positions.

11 Claims, 8 Drawing Sheets

STAY FOR DUMP BODY

FIELD OF THE DISCLOSURE

The present disclosure relates to a stay to hold a dump body in a raised position.

BACKGROUND OF THE DISCLOSURE

A dump truck, such as an articulated dump truck, has a dump body to haul material therein and dump the material at a desired location. From time to time, the dump is serviced. It is known to lock the dump body of an articulated dump truck when the dump body is raised for service.

SUMMARY OF THE DISCLOSURE

According to the present disclosure, a dump truck has a frame, a dump body, and a stay to hold the dump body selectively in multiple raised positions relative to the frame.

According to another aspect of the present disclosure, the dump truck has a frame, a dump body secured to the frame to pivot relative thereto between a home position, a first raised position higher than the home position, and a second raised position higher than the first raised position, and a stay selectively positionable in a first use position in which the stay holds the dump body in the first raised position and a second use position in which the stay holds the dump body in the second raised position. The stay is secured to the dump body and the frame when the stay is positioned in the first and second use positions. The stay has a first length in the first use position and a second length in the second use position, and the second length is shorter than the first length.

According to another aspect of the present disclosure, a dump truck has a frame, a dump body secured to the frame to pivot relative thereto between a home position, a first raised position higher than the home position, and a second raised position higher than the first raised position, lift cylinders secured to the frame and the dump body to pivot the dump body relative to the frame between the home position, the first raised position, and the second raised position, and a stay re-configurable relative to the frame between a first use position in which the stay holds the dump body in the first raised position and a second use position in which the stay holds the dump body in the second raised position.

When the dump body is raised for service to either the first raised position or the second raised position, the stay may be used to hold the dump body in that raised position. The second raised position may be too high for service inside some buildings (e.g., it may be the full raised position of the dump body), whereas the first raised position may be low enough for service inside such buildings, in which case the stay may be used to hold the dump body in the first raised position. The stay may be used to hold the dump body in the second raised position, for example, in buildings with a sufficiently high ceiling, or when the dump body is outside. As such, the stay may be used to provide for those two positions of body height locking.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
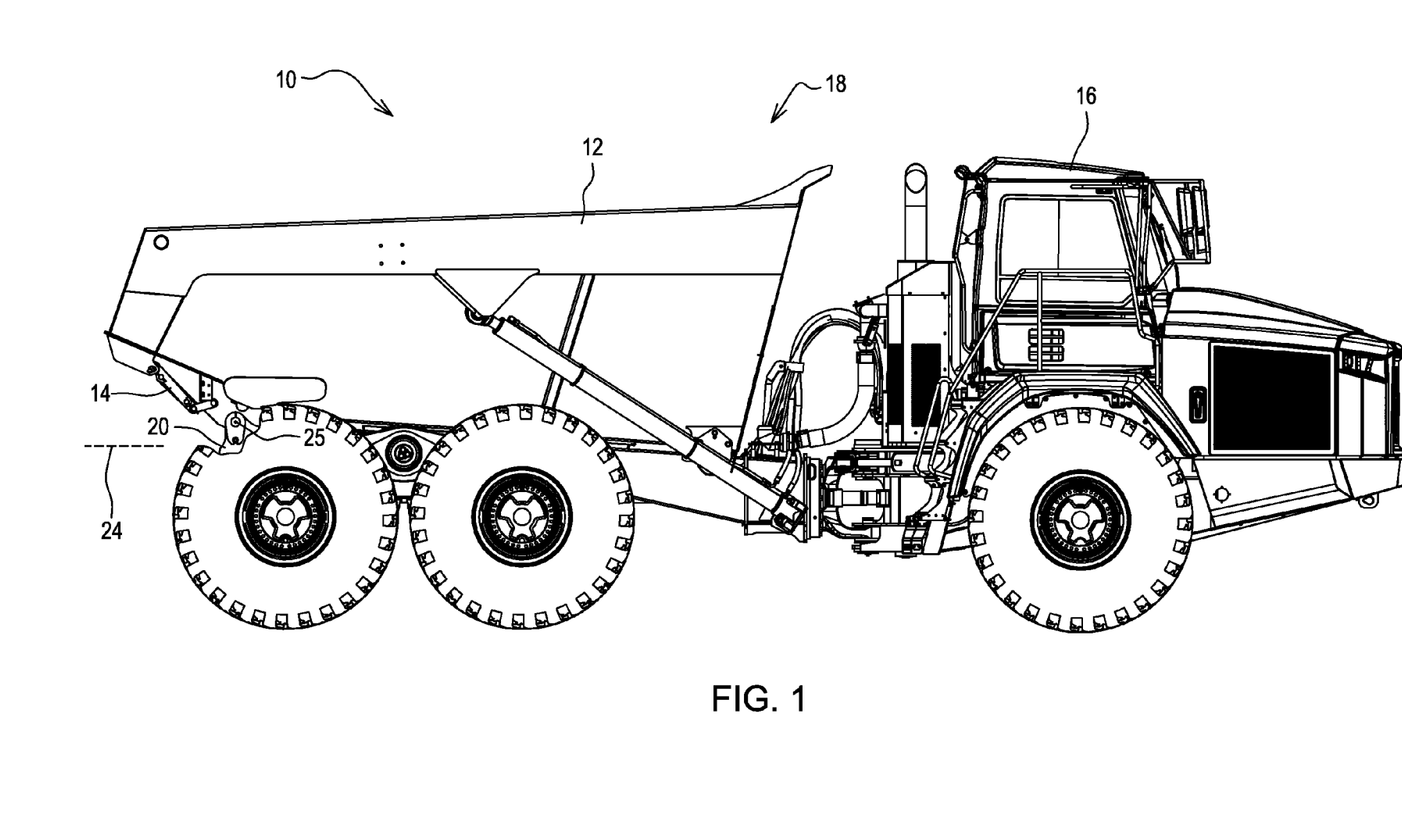
FIG. 1 is a right-side elevation view showing an exemplary dump truck.

Referring to FIG. 1, a dump truck 10 has a dump body 12 and a stay 14. The dump body 12 is provided to hold the dump body 12 selectively in multiple raised positions, for example, to service the dump body 12 in any of such raised positions.

Illustratively, the truck 10 may be configured as an articulated dump truck. In such a case, the truck 10 may have a front section or power head 16 and a rear section 18, the front and rear sections 16, 18 articulated to one another.

The rear section 18 may have a frame 20, and the dump body 12 may be secured to the frame 20 to pivot relative thereto between a home position and multiple raised positions, such as, for example, a first raised position higher than the home position and a second raised position higher than the first raised position. The dump body 12 may be made, for example, of high strength low alloy steel.

The frame 20 may have a left beam 22 and a right beam 22, as shown, for example, with respect to the right beam 22 in FIG. 1. The left and right beams 22 extend in the fore-aft direction 24 of the truck 10. Cross-members that extend cross-wise to the fore-aft direction 24 interconnect the beams 22. Such cross-members include an oscillation joint housing at the front of the beams 22, a rear cross beam at the rear of the beams 22, and an intermediate cross beam positioned between the oscillation joint housing and the rear cross beam. The members of the frame 20 may be made of high strength low alloy steel.

Figure 2:
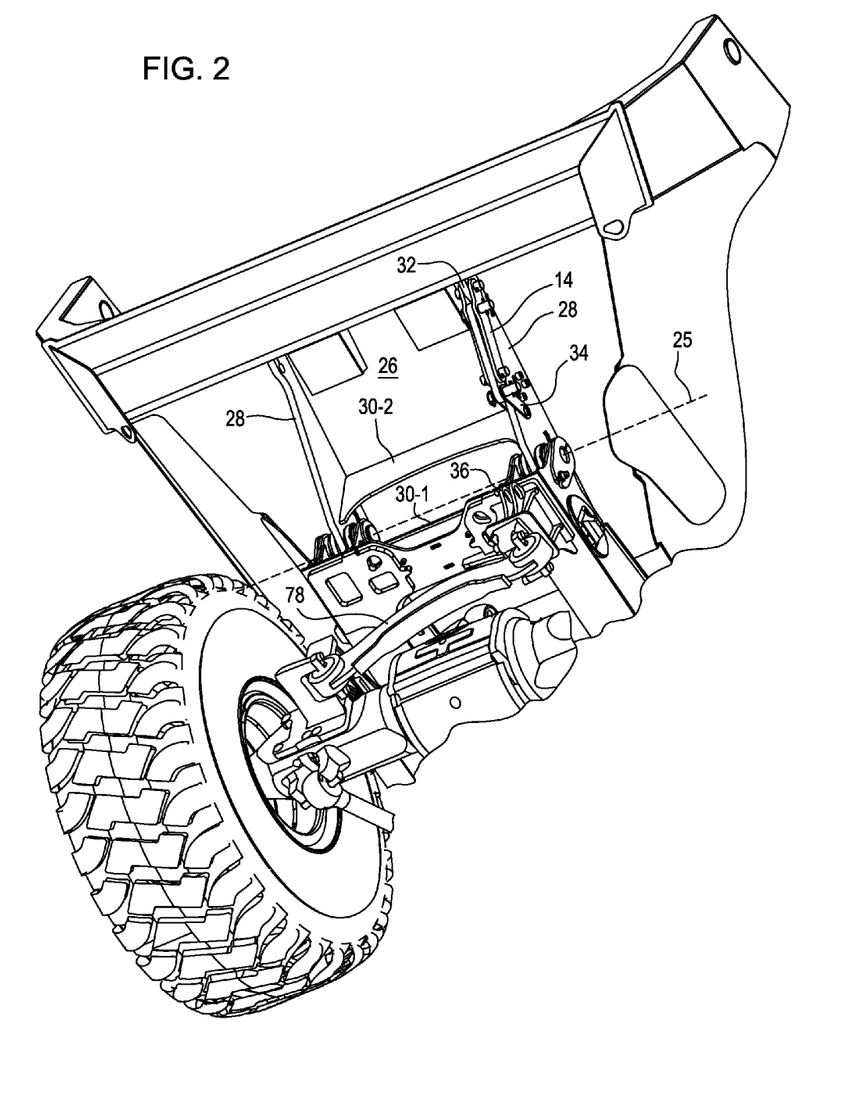
FIG. 2 is a rear perspective view of the dump truck.
Figure 3:
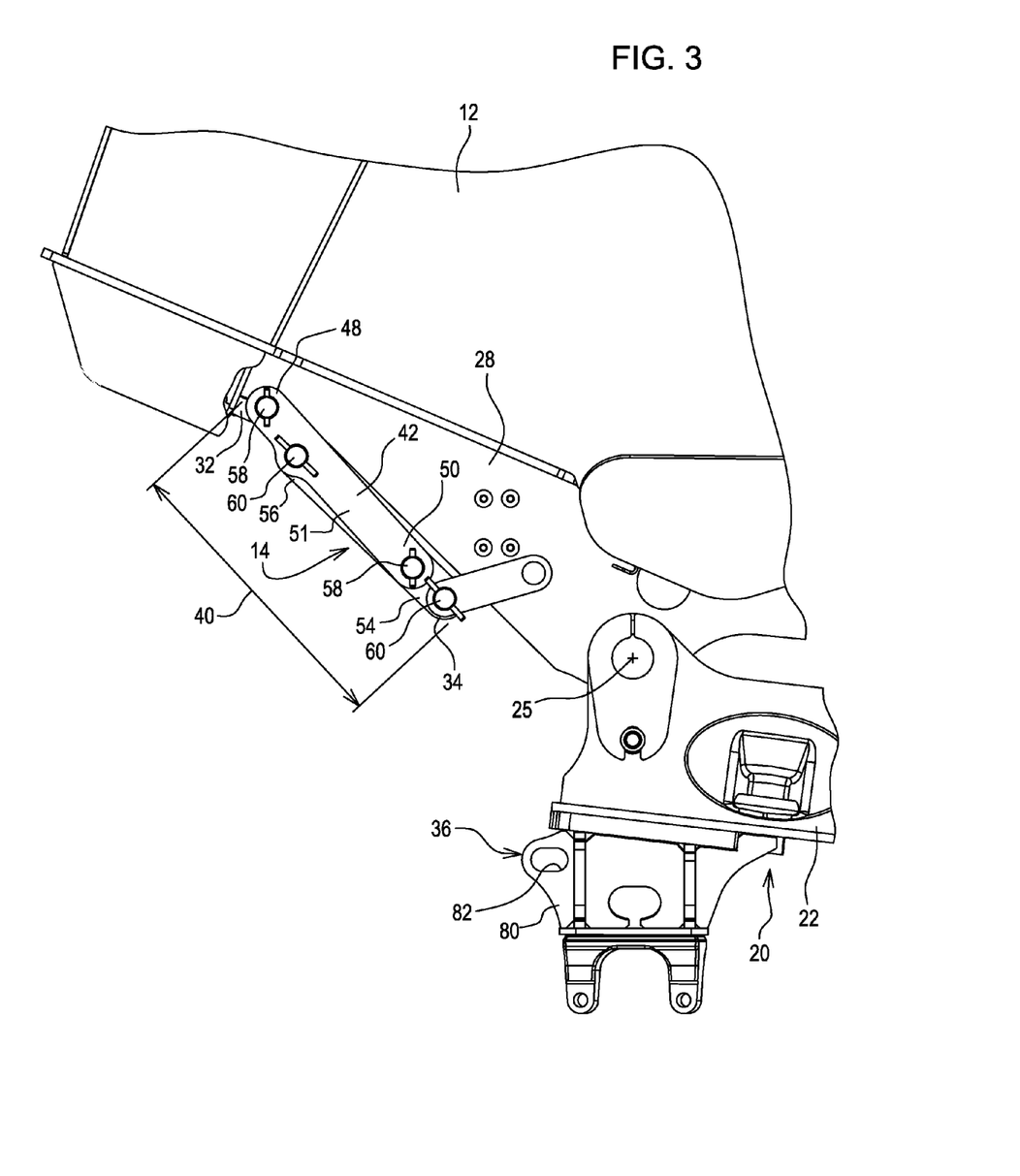
FIG. 3 is a right-side elevation view showing a stay for a dump body of the dump truck positioned in a storage position.
Figure 4:
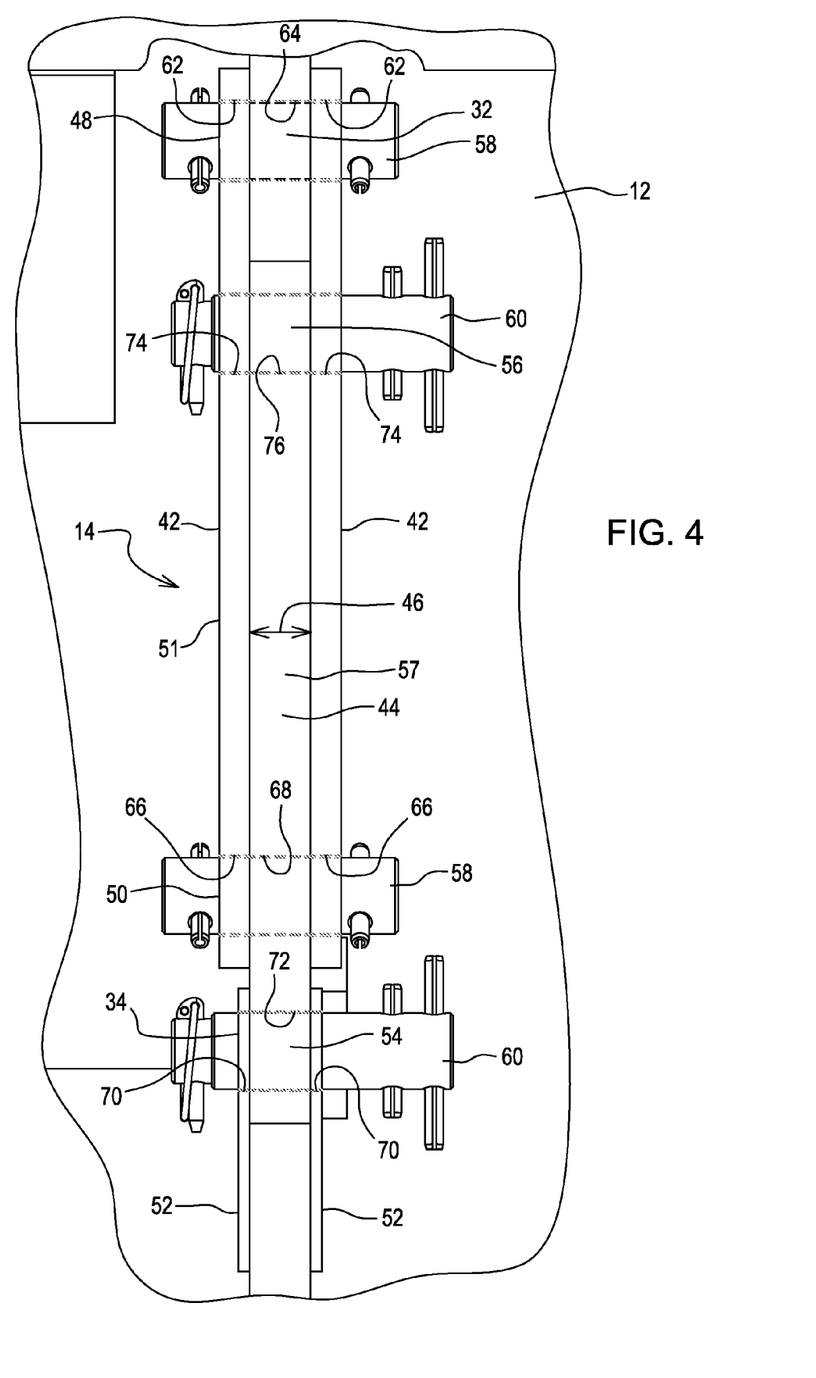
FIG. 4 is a rear elevation view showing the stay positioned in the storage position.

Referring to FIG. 2, the dump body 12 is secured pivotally to the beams 22 for pivotable movement about a pivot axis 25. The dump body 12 may have a central rear plate 26, a left pivot plate 28, and a right pivot plate 28. The left and right pivot plates 28 may be fixed (e.g., welded) to the central rear plate 26 and reinforced laterally by a rearward gusset 30-1 and a front gusset 30-2, the gussets 30-1, 30-2 being fixed (e.g., welded) to the central rear plate 26 and the pivot plates 28. Each pivot plate 28 is pinned to a respective beam 22 with a respective pin to pivot relative to the frame 20.

Figure 5:
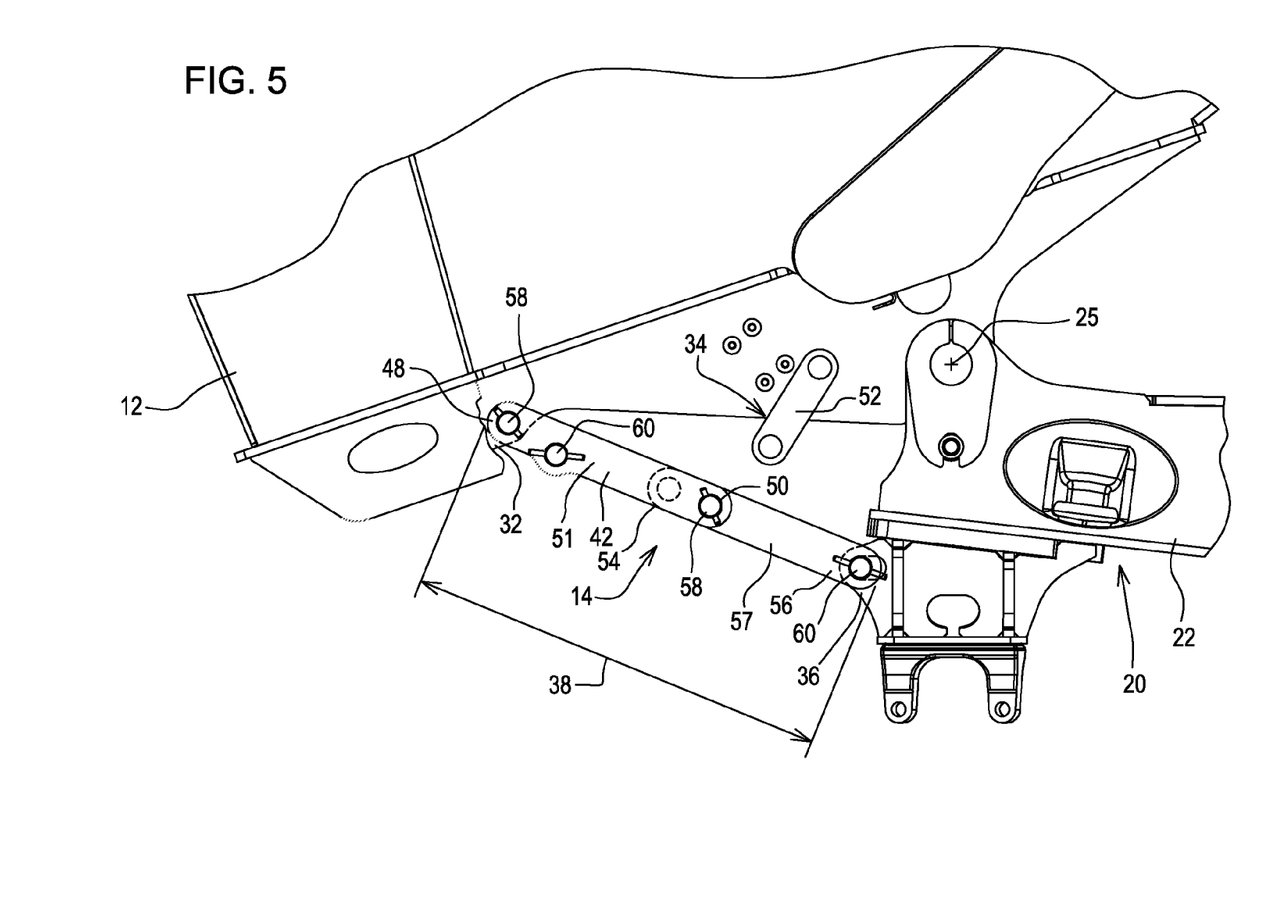
FIG. 5 is a right-side elevation view showing the stay positioned in a first use position holding the dump body in a first raised position.
Figure 6:
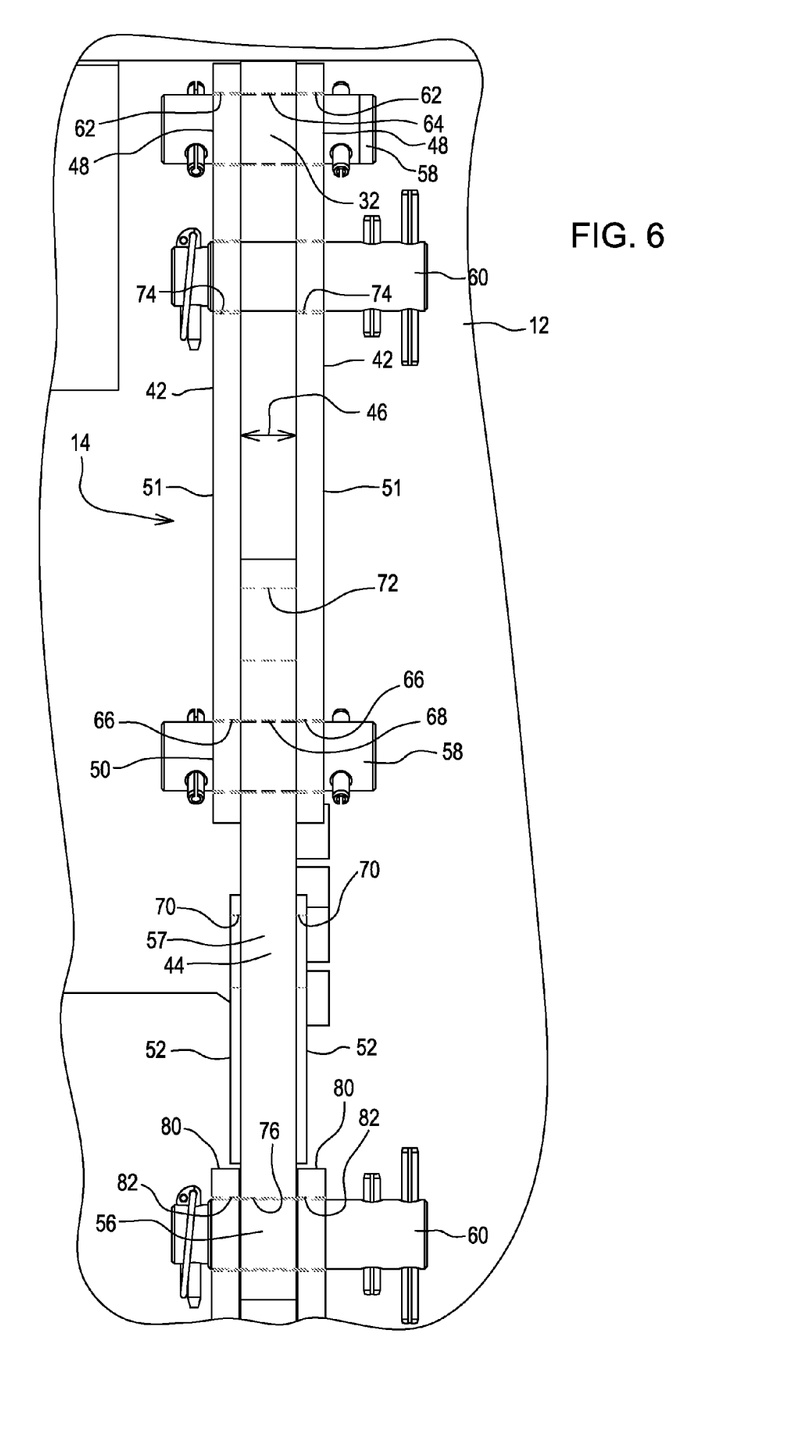
FIG. 6 is a rear elevation view showing the stay positioned in the first use position.
Figure 7:
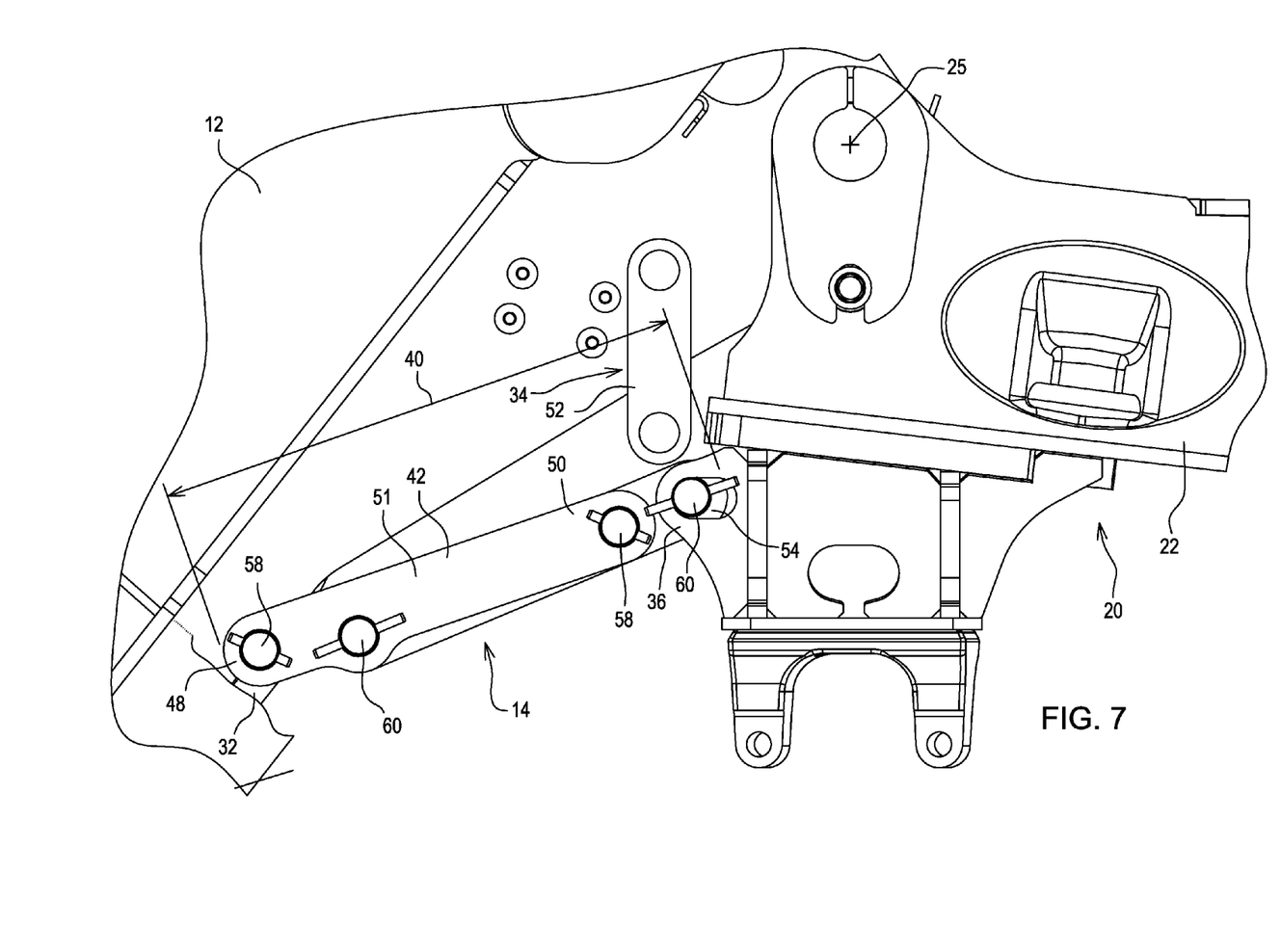
FIG. 7 is a right-side elevation view showing the stay positioned in a second use position holding the dump body in a second raised position higher than the first raised position.
Figure 8:
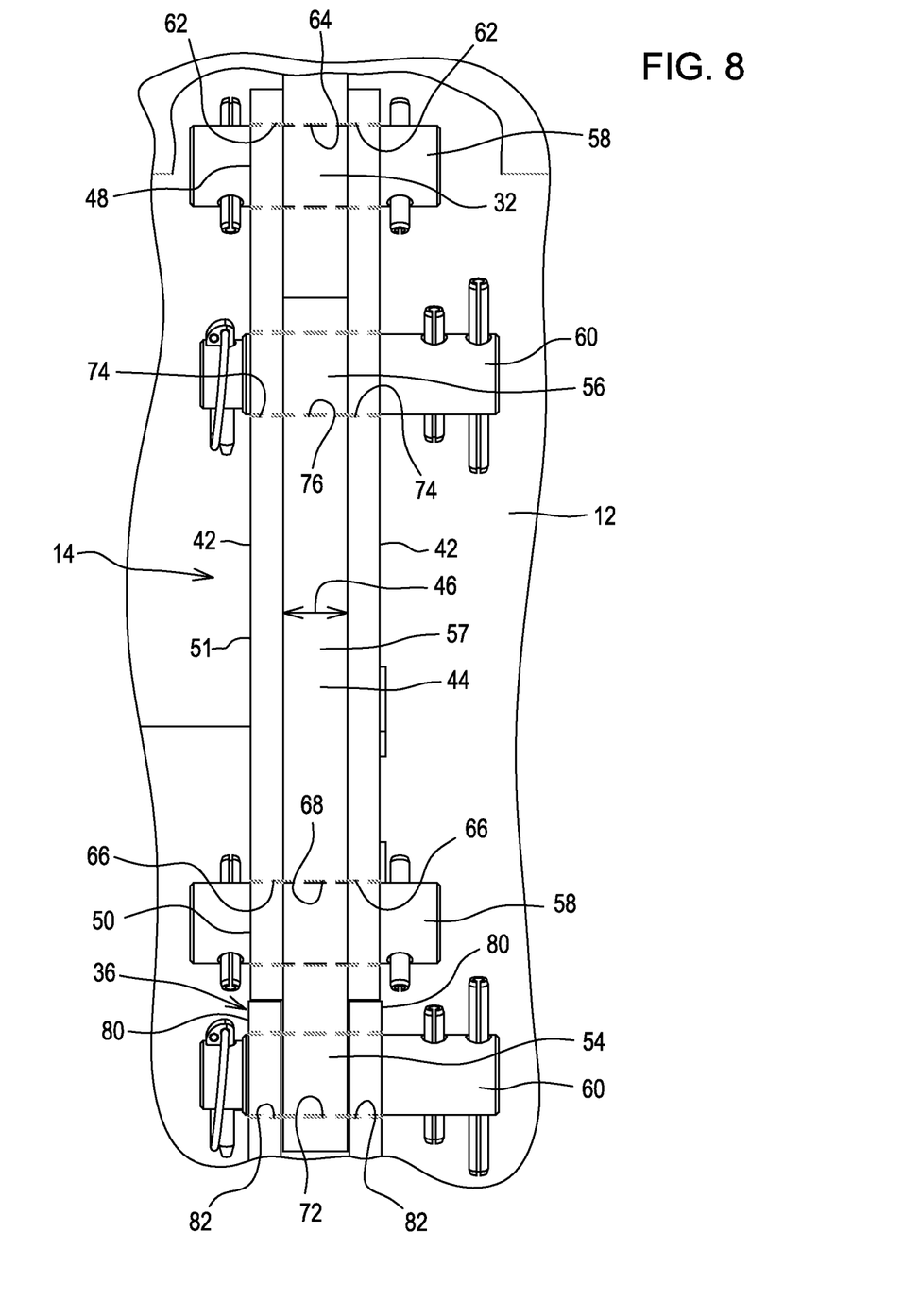
FIG. 8 is a rear elevation view showing the stay positioned in the second use position.

Referring back to FIG. 1, hydraulic lift cylinders 22 may be secured to the frame 20 and the dump body 12 to pivot the dump body 12 relative to the frame 20, including between the home position (FIGS. 1-4), the first raised position (FIGS. 5 and 6), and the second raised position (FIGS. 7 and 8). The rear section 18 may have two such lift cylinders 22, one on each of the left and right sides of the rear section 18. In the home position, the dump body 12 rests on the beams 22. The dump body 12 may rest on each beam 22 via, for example, a number of pads (e.g., four) positioned between the dump body 12 and that beam 22. In the first and second raised positions, the dump body 12 may be raised off the beams 22 except at the rear where the dump body 12 is secured pivotally to the beams 22.

Referring to FIGS. 3-8, the stay 14 is selectively positionable in a storage position (FIGS. 3 and 4), a first use position (FIGS. 5 and 6), and a second use position (FIGS. 7 and 8). The stay 14 may be stored in the storage position. In the storage position, the dump body 12 is free to raise and lower unrestrained by the stay 14. In the first use position, the stay 14 holds the dump body 12 in the first raised position, such as for servicing of the dump body 12 in a building or other location with a relatively low ceiling. In the second use position, the stay 14 holds the dump body 12 in the second raised position, such as for service of the dump body 12 in a building or other location with a relatively high ceiling.

The stay 14 may be positioned rearward of the pivot axis 25, and the center of gravity of the dump body 12 is positioned forward of the pivot axis 25. As such, in the first use position, the stay 14 may prevent the dump body 12 from lowering relative to the first raised position, and, in the second use position, the stay 14 may prevent the dump body 12 from lowering relative to the second raised position. The stay 14 may be re-configurable relative to the frame 20 between the storage position, the first use position, and the second use position. In the storage position, the stay 14 may be secured respectively to a first body attachment point 32 of the dump body 12 and a second body attachment point 34 of the dump body 12. In the first and second use positions, the stay 14 may be secured to the first body attachment point 32 and a frame attachment point 36 of the frame 20. The stay 14 may be secured pivotally to those attachment points 32, 34, 36.

The length of the stay 14 may be adjustable. For example, the stay 14 may have a first length 38 in the storage position and the first use position, and a second length 40 in the second use position. The second length 40 may be shorter than the first length 38, such that, with respect to the use positions, the second raised position is higher than the first raised position. The stay 14 may be folded in the storage position and the second use position so as to have the second length 40, and may be unfolded in the first use position so as to have the first length 38.

The stay 14 may be configured, for example, as a linkage. As a linkage, the stay 14 may be foldable as discussed above, and may have a first linkage section and a second linkage section. The first and second linkage sections may be secured pivotally to one another and may be folded relative to one another in the storage position and the second use position and unfolded relative to one another in the first use position. The first linkage section may have two laterally outer links 42 (made, for example, of high strength low alloy steel). The second linkage section may have an intermediate link 44 (made, for example, of high strength low alloy steel). The stay 14 may have a number of pins including, for example, two pins 58 (made, for example, of steel) and two pins 60 (made, for example, of steel). Most of a length of the intermediate link 44 may be nested in a gap 46 defined laterally between the outer links 42 in the storage and second use positions, and most of the length of the intermediate link 44 may be positioned outside the gap 46 so as to lengthen the stay 14 in the first use position.

Each of the outer links 42 may have a first end portion 48, a second end portion 50, and an intermediate portion 51 positioned between the first and second end portions 48, 50. The intermediate link 44 may have a first end portion 54, a second end portion 56, and an intermediate portion 57 positioned between the first and second end portions 54, 56.

Each pin 58 may have a main body and a pair of spring dowels. Each dowel may be configured generally as a tube that is radially deflectable due to a longitudinal groove extending the length of, and radially through the side wall of, the tube. Each dowel may be pressed into a diametral through-hole of a respective end portion of the main body so as to remain there normally. The dowels cooperate to retain the main body in an installed position.

Each pin 60 may have a main body, an inner spring dowel, an outer spring dowel, and a retainer. Each of the inner and outer spring dowels may be configured generally as a tube that is radially deflectable due to a longitudinal groove extending the length of, and radially through the side wall of, the tube, and may be pressed into a respective diametral through-hole of a first end portion of the main body so as to remain there normally. The retainer may include a dowel (e.g., solid) extending through an opposite second end portion of the main body and a ring secured to an end of the dowel to pivot relative to the main body between a first position looped around the second end portion of the main body to prevent removal of the dowel from the second end portion of the main body (FIGS. 4, 6, and 8) and a second position not looped around the second end portion of the main body allowing removal of the dowel therefrom. When the ring is positioned in its first position, the retainer and the inner dowel cooperate to retain the main body in an installed position. When the retainer is removed from the main body, an operator may use his/her fingers to pull on the outer dowel in a first direction to uninstall the main body. The inner dowel limits travel of the main body in an opposite second direction so as to provide finger room for the operator to pull on the outer dowel. The main body may be installed by insertion of the main body in the second direction and securing the main body in place with the retainer.

The pins 58 may be used to secure the stay 14 in each of the storage position, the first use position, and the second use position, and may normally remain secured as such during transition of the stay 14 between those positions. The outer links 42 may be secured pivotally to the first body attachment point 32 with a first of the pins 58. The first end portions 48 of the outer links 42 may provide a first end portion of the stay 14, and may be pinned to the first body attachment point 32 with the first pin 58 in each of the storage position, the first use position, and the second use position. Each of the first end portions 48 may have a through-hole 62. The first body attachment point 32 may be included in the right pivot plate 28, and may have a through-hole 64 (the through-hole 64 may be flame-cut resulting in a narrow slit in the right pivot plate 28 between the through-hole 64 and a rear peripheral edge of the right pivot plate due to a continuous cut into the through-hole 64 and back out without having to stop the torch). The main body of the first pin 58 may extend through the through-holes 62 of the first end portions 48 and the through-hole 64 of the first body attachment point 32, and the two spring dowels of the first pin 58 may be pressed into the respective end portion of the main body to retain the main body in the through-holes 62, 64.

The intermediate link 44 may be secured pivotally to the outer links 42 with the second pin 58. The second end portions 50 of the outer links 42 may be pinned to the intermediate portion 57 of the intermediate link 44 with the second pin 58 in each of the storage position, the first use position, and the second use position. Each of the second end portions 50 may have a through-hole 66, and the intermediate portion 57 of the intermediate link 44 may have a through-hole 68. The main body of the second pin 58 may extend through the through-holes 66 of the second end portions 50 of the outer links 42 and the through-hole of the intermediate portion 57 of the intermediate link 44, and the two spring dowels of the second pin 58 may be pressed into the respective end portion of the main body to retain the main body in the through-holes 62, 64.

Both of the second pins 60 may be used to secure the stay 14 in the storage and second raised positions, whereas only one of the second pins 60 may be used to secure the stay in the first raised position. In the storage position, the first end portion 54 of the intermediate link 44 may be pinned to the second body attachment point 34 with a first of the pins 60, and the second end portion 56 of the intermediate link 44 may be pinned to the intermediate portions 51 of the outer links 42 with a second of the pins 60. The second body attachment point 34 may be positioned forward of the first body attachment point 32, and may include a pair of links 52. Each link 52 may have a proximal portion and a distal portion. The proximal portions of the links 52 may be fixed (e.g., welded) to laterally opposite sides of the right pivot plate 28, and each distal portion may have a through-hole 70. The main body of the first pin 60 may extend through the through-holes 70 of the distal portions of the links 52 and a through-hole 72 of the first end portion 54 of the intermediate link 44. The main body of the second pin 60 may extend through respective through-holes 74 of the intermediate portions 51 of the outer links 42 and a through-hole 76 of the second end portion 56 of the intermediate link 44.

In the first use position, the intermediate link 44 may be secured pivotally to the frame attachment point 36 with either pin 60, such as the second pin 60. The second end portion 56 of the intermediate link 44 may be pinned to the frame attachment point 36 with the pin 60. The frame attachment point 36 may be included in a suspension bracket of the frame 20, the suspension bracket providing an attachment point for a suspension bar 78 that promotes axle side-to-side stability. The frame attachment 36 point may have a pair of flanges 80, each with a through-hole 82. The main body of the pin 60 may extend through the through-holes 82. Each through-hole 82 may be oval in shape to provide the operator some dump body height leeway during establishing the dump body at the first raised position. In the first raised position, the other pin 60 may preferably be stored in the through-holes 74 of the intermediate portion 51 of the outer links 42, or may be stored in the through-holes 70 of the second body attachment point.

In the second use position, the first end portion 54 of the intermediate link 44 may be pinned to the frame attachment point 34 with the first pin 60, and the second end portion 56 of the intermediate link 44 may be pinned to the intermediate portions 51 of the outer links 42 with the second pin 60. The main body of the first pin 60 may extend through the through-holes 70 of the distal portions of the links 52 and a through-hole 72 of the first end portion 54 of the intermediate link 44. The main body of the first pin 60 may extend through the respective through-holes of the frame attachment point 36 and the through-hole of the first end portion 54 of the intermediate link 44. The main body of the second pin 60 may extend through respective through-holes 74 of the intermediate portions 51 of the outer links 42 and the through-hole 76 of the second end portion 56 of the intermediate link 44.

The stay 14 may be stored in the storage position on board the truck 10. When the dump body 12 is raised for service such as, for example, to either the first raised position or the second raised position, the stay 14 may be used to hold the dump body 12 in that raised position. The stay 14 may be used to hold the dump body 12 in the second raised position, for example, when the truck 10 is inside buildings with a sufficiently high ceiling, or when the dump body 12 is outside. Some buildings may have a relatively low ceiling, in which case the second raised position may be too high for service inside such buildings (e.g., the second raised position may be the full raised position of the dump body 12, such as 70 degrees), whereas the first raised position may be low enough (e.g., about half of the full raised position, such as 37 degrees). The stay 14 may be used to hold the dump body 12 in the first raised position in those cases. As such, the stay 14 may be used to provide for those two positions of body height locking.

The stay 14 may be switched from the storage position to the first use position. The first and second pins 60 may be removed detaching the stay 14 from the second body attachment point 34 and allowing the second end portions 50 of the outer links 42 to pivot down about an axis defined by the first pin 58 and the second end portion 56 of the intermediate link 44 to pivot down about an axis defined by the second pin 58 unfolding the stay 14. The second end portion 56 of the intermediate link 44 is secured pivotally to the frame attachment point 36 with one of the pins 60 while the other pin 60 may be secured to the intermediate portions 51 of the outer links 42, or to the second body attachment point 34. Before the second end portion 56 of the intermediate link 44 is secured to the frame attachment point 36, the dump body 12 may be positioned near the first raised position or somewhere between the first and second raised positions. The oval shape of the through-holes 78 may allow leeway in the height of the dump body 12 around the first raised position, facilitating securement of the second end portion 56 to the frame attachment point 36 by the operator. If the dump body 12 is positioned above the first raised position during securement of the second end portion 56 to the frame attachment point 36, the stay 14 can scissor about the second pin 58 to accommodate this position, after which the dump body 12 can be lowered to the first raised position. The stay 14 may be switched from the first use position to the storage position by following a reverse procedure.

The stay 14 may be switched from the storage position to the second use position. The first pin 60 may be removed detaching the stay 14 from the second body attachment point 34 and allowing the first end portion 54 of the intermediate link 44 to pivot down about an axis defined by the first pin 58. The first end portion 54 of the intermediate link 44 is secured pivotally to the frame attachment point 36 with the first pin 60. Before the first end portion 54 of the intermediate link 44 is secured to the frame attachment point 36, the dump body 12 may be positioned near the second raised position. The oval shape of the through-holes 78 may allow leeway in the height of the dump body 12 around the second raised position, facilitating securement of the first end portion 54 to the frame attachment point 36 by the operator. The stay 14 may be switched from the second use position to the storage position by following a reverse procedure.

The stay 14 may be switched from the second raised position to the first use position. The first and second pins 60 may be removed detaching the stay 14 from the frame attachment point 36 and allowing the second end portions 50 of the outer links 42 to pivot about an axis defined by the first pin 58 and the second end portion 56 of the intermediate link 44 to pivot about an axis defined by the second pin 58 unfolding the stay 14. The second end portion 56 of the intermediate link 44 is secured pivotally to the frame attachment point 36 with one of the pins 60 while the other pin 60 may be secured to the intermediate portions 51 of the outer links 42, or to the second body attachment point 34. Before the second end portion 56 of the intermediate link 44 is secured to the frame attachment point 36, the dump body 12 may be positioned near the first raised position or somewhere between the first and second raised positions. The oval shape of the through-holes 78 may allow leeway in the height of the dump body 12 around the first raised position, facilitating securement of the second end portion 56 to the frame attachment point 36 by the operator. If the dump body 12 is positioned above the first raised position during securement of the second end portion 56 to the frame attachment point 36, the stay 14 can scissor about the second pin 58 to accommodate this position, after which the dump body 12 can be lowered to the first raised position. The stay 14 may be switched from the first use position to the second use position by following a suitable reverse procedure.

The stay 14 may be used on non-articulated dump trucks as well. For ease of illustration, welds have not been shown, but are to be understood.

While the disclosure has been illustrated and described in detail in the drawings and foregoing description, such illustration and description is to be considered as exemplary and not restrictive in character, it being understood that one or more illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A dump truck, comprising:
   a frame,
   a dump body secured to the frame to pivot relative thereto between a home position, a first raised position higher than the home position, and a second raised position higher than the first raised position, and
   a stay selectively positionable in a first use position in which the stay holds the dump body in the first raised position and a second use position in which the stay holds the dump body in the second raised position, the stay secured to the dump body and the frame when the stay is positioned in the first and second use positions, the stay comprising a first length in the first use position and a second length in the second use position, the second length shorter than the first length.

2. The dump truck of claim 1, wherein the stay is unfolded in the first use position and folded in the second use position.

3. The dump truck of claim 2, wherein the stay comprises a linkage, the linkage comprises two outer links and an intermediate link, most of a length of the intermediate link is nested in a gap defined between the outer links in the second use position, and most of the length of the intermediate link is positioned outside the gap in the first use position.

4. The dump truck of claim 3, wherein the dump body comprises a body attachment point, the frame comprises a frame attachment point, each of the outer links comprises a first end portion and a second end portion, the intermediate link comprises a first end portion and a second end portion, the first end portions of the outer links are pinned to the body attachment point, in the first use position the first end portion of the intermediate link is pinned to the second end portions of the outer links and the second end portion of the intermediate link is pinned to the frame attachment point, in the second use position the first end portion of the intermediate link is pinned to the frame attachment point and the second end portion of the intermediate link is pinned to the outer links and the second end portions of the outer links are pinned to the intermediate link.

5. The dump truck of claim 4, wherein each of the outer links comprises an intermediate portion positioned between the first and second end portions of that outer link, the intermediate link comprises an intermediate portion positioned between the first and second end portions of the intermediate link, in the second use position the second end portions of the outer links are pinned to the intermediate portion of the intermediate link and the second end portion of the intermediate link is pinned to the intermediate portions of the outer links.

6. The dump truck of claim 5, wherein the body attachment point is a first body attachment point, the dump body comprises a second body attachment point, and the stay is selectively positionable in a storage position in which the first end portion of the intermediate link is pinned to the second body attachment point, the second end portion of the intermediate link is pinned to the intermediate portions of the outer links, and the second end portions of the outer links are pinned to the intermediate portion of the intermediate link.

7. The dump truck of claim 4, wherein the body attachment point is a first body attachment point, the dump body comprises a second body attachment point, and the stay is selectively positionable in a storage position in which the first end portion of the intermediate link is pinned to the second body attachment point, the second end portion of the intermediate link is pinned to the outer links, and the second end portions of the outer links are pinned to the intermediate link.

8. The dump truck of claim 1, wherein, in the first and second use positions, the stay is secured to a first body attachment point of the dump body and a frame attachment point of the frame, and the stay is selectively positionable in a storage position in which the stay is secured to the first body attachment point and a second body attachment point of the dump body.

9. The dump truck of claim 1, wherein the stay is selectively positionable in a storage position secured to a first body attachment point and a second body attachment point.

10. The dump truck of claim 1, wherein the stay comprises a foldable linkage.

11. The dump truck of claim 10, wherein the linkage comprises a first linkage section and a second linkage section, and the first and second linkage sections are secured pivotally to one another and are folded relative to one another in the second use position and unfolded relative to one another in the first use position.

* * * * *